(12) United States Patent
Hamm et al.

(10) Patent No.: US 8,125,466 B2
(45) Date of Patent: Feb. 28, 2012

(54) SCREEN WITH CAPACITIVE TOUCH ZONES

(75) Inventors: Alain Hamm, Lignieres (CH); Emile Grosjacques, Saint-Blaise (CH)

(73) Assignee: EM Microelectronic-Marin S.A., Marin (CH)

( * ) Notice: Subject to any disclaimer, the term of this patent is extended or adjusted under 35 U.S.C. 154(b) by 688 days.

(21) Appl. No.: 12/338,902

(22) Filed: Dec. 18, 2008

(65) Prior Publication Data

US 2009/0167721 A1 Jul. 2, 2009

(30) Foreign Application Priority Data

Dec. 19, 2007 (EP) ................................. 07150136

(51) Int. Cl.
*G06F 3/045* (2006.01)
(52) U.S. Cl. ...................................................... 345/174
(58) Field of Classification Search .................. 345/174, 345/173, 176; 178/18.01; 174/255
See application file for complete search history.

(56) References Cited

U.S. PATENT DOCUMENTS

| 2005/0126831 A1 | 6/2005 | Richter et al. |
| 2006/0001655 A1 | 1/2006 | Tanabe |
| 2006/0097991 A1* | 5/2006 | Hotelling et al. ............ 345/173 |
| 2008/0314626 A1* | 12/2008 | Moore ........................ 174/255 |
| 2009/0096761 A1* | 4/2009 | Cho ........................... 345/174 |

FOREIGN PATENT DOCUMENTS

| EP | 2004046905 A2 | 6/2004 |
| EP | 1840714 A1 | 10/2007 |
| EP | 1870799 A1 | 12/2007 |
| WO | 2006/007071 A1 | 1/2006 |
| WO | 2006/028131 A1 | 3/2006 |

OTHER PUBLICATIONS

Partial European Search Report issued in corresponding application No. EP 07 15 0136, completed Jun. 5, 2008.

* cited by examiner

*Primary Examiner* — Fred Tzeng
(74) *Attorney, Agent, or Firm* — Griffin & Szipl, P.C.

(57) ABSTRACT

Capacitive touch screen including first and second substrates (2, 4) that extend parallel to and at a distance from each other, said first and second substrates (2, 4) being made of a transparent, dielectric material, a first series of electrodes (6), made of a transparent, electrically conductive material, being arranged on at least the surface (2a) of the first substrate (2) that faces the second substrate (4), said touch screen being characterized in that it includes means for keeping the space between the two substrates (2, 4) constant.

27 Claims, 1 Drawing Sheet

SCREEN WITH CAPACITIVE TOUCH ZONES

This application claims priority from European Patent Application No. 07150136.5, filed Dec. 19, 2007, the entire disclosure of which is incorporated herein by reference.

FIELD OF THE INVENTION

The present invention concerns a screen with capacitive touch zones. More specifically, the invention concerns a capacitive touch screen, which will, for example, be arranged above a display screen, and which includes first and second substrates arranged parallel to and at a distance from each other, made of a transparent, dielectric material, at least the surface of the first substrate, which faces the second substrate, being provided with a series of transparent electrodes corresponding to touch zones, the electrodes being formed by a layer of electrically conductive material.

BACKGROUND OF THE INVENTION

Touch zones screens of the type described above are commonly used, particularly in combination with the display screens of some portable electronic apparatus, such as telephones and watches with a touch glass. By arranging a touch zone screen above the display screen, it is possible to control various electronic functions of the associated portable device.

Capacitive touch zone screens operate in accordance with the principle of capacitance variation, which is observed when the user moves his finger towards the desired electrode. This capacitance is inversely proportional to the distance that separates the electrode concerned from a corresponding counter-electrode, the intersection of said electrode with said corresponding counter-electrode defining the touch zone. It is thus crucial to be able to control this distance with the highest level of precision so that the electronic control circuit of the portable apparatus can interpret the capacitance variation properly as corresponding to the introduction of a command.

Another problem with touch zone screens lies in the fact that although they are made of transparent material, the electrodes are always at least partially visible, notably because of ambient light reflections on the touch screen. These reflections are detrimental to the general appearance of the apparatus and can interfere with the visibility of information displayed on the display screen of the apparatus.

It is an object of the present invention to overcome the aforementioned problems, in addition to others, by providing a capacitive touch-zone screen, wherein an associated electronic circuit interprets the control signals without causing any errors or malfunction. The present invention also provides a capacitive touch screen whose electrodes are invisible or practically invisible to the user.

SUMMARY OF THE INVENTION

The present invention therefore concerns a capacitive touch screen including first and second substrates that extend parallel to and at a distance from each other, these first and second substrates being made of a transparent, dielectric material, a first series of electrodes made of a transparent and electrically conductive material being arranged on at least the surface of the first substrate that faces the second substrate, this touch screen being characterized in that it includes means for keeping the space between the two substrates constant.

Owing to these features, the present invention provides a capacitive touch-zone screen including means that guarantee a constant parallelism between the first and second substrates. This prevents any risk of the electronic control circuit of the portable object associated with a touch screen according to the invention erroneously interpreting the variation measurement of the capacitance associated with a touch zone, for example because the user presses too hard on the screen and thus alters the distance between the two substrates.

According to a complementary feature of the invention, a second series of electrodes made of a transparent, electrically conductive material, is arranged on the surface of the second substrate that faces the first substrate.

It will be clear that the present invention applies in an identical manner to digital capacitive touch zone screens and to analogue capacitive touch zones screen.

According to a first variant of the invention, the first and second substrates are joined to each other by means of a sealing frame, which extends along the external perimeter of these two substrates, and which defines a volume for containing a fluid, whose optical refractive index is substantially equal to that of the first substrate.

The sealing frame joins the first and second substrates in a solid and reliable manner. Moreover, the volume delimited by the sealing frame is advantageously filled with a transparent, anisotropic or isotropic fluid, whose optical refractive index is substantially equal to that of the first substrate. This optically compensates for the presence of the electrodes by homogenizing the refractive index in the layer located at the interface with the first substrate and by making the electrodes practically invisible to the naked eye.

By way of example, the fluid that fills the containment volume delimited by the sealing frame can be a liquid crystal. Given that the liquid crystal is used only as filling liquid and that its optical properties are of no interest, except for the optical refractive index, an inexpensive liquid crystal can be chosen.

According to a complementary feature of the invention, spacers are dispersed in the volume delimited by the sealing frame.

Owing to this other feature, the first and second substrates are not only held securely to each other by the sealing frame along their external periphery, but the presence of spacers also provides a very rigid connection between the substrates and excellent control of the distance between them. It is therefore impossible for the substrates to move closer together on their inside surfaces. Thus, the first substrate cannot bend when the user presses on a touch zone with his finger, so that the space between the two substrates remains constant whatever the conditions of use and the variation measurement of the capacitance associated with a touch zone by the electronic control circuit cannot be distorted.

According to a second variant, the first and second substrates are joined to each other by means of an adhesive layer formed of optical adhesive in which spacers are distributed.

The spacers are typically balls or cylindrical portions whose geometrical features are perfectly defined and which, when dispersed in the optical adhesive that joins the first and second substrates, can control the thickness of the adhesive layer, and thus the space between the two substrates, with a high level of precision.

According to a complementary feature of the invention, the two series of electrodes made on the opposite surfaces of the first and second substrates can be coated with a layer of transparent, dielectric material, whose optical refractive index is ideally comprised between the optical refractive index of the first substrate and the optical refractive index of the electrically conductive material of which the electrodes are made, to further improve optical compensation.

BRIEF DESCRIPTION OF THE DRAWINGS

Other features and advantages of the present invention will appear more clearly upon reading the following detailed description of several embodiment examples of a capacitive touch-zone screen according to the invention, these examples being given purely by way of non-limiting illustration with reference to the annexed drawing, in which.

DETAILED DESCRIPTION OF THE ILLUSTRATIVE EMBODIMENTS

The present invention proceeds from the general inventive idea that consists in providing a capacitive touch-zone screen, defined by two front and back substrates, at least one of which carries a series of electrodes and wherein the space between the two substrates is precisely controlled so that no errors are generated in the capacitance measurement of a touch zone. It is also an object of the invention to provide a touch screen with capacitive zones of this type wherein the presence of said zones is optically compensated so as to make the zones invisible to the naked eye.

Figure 1:
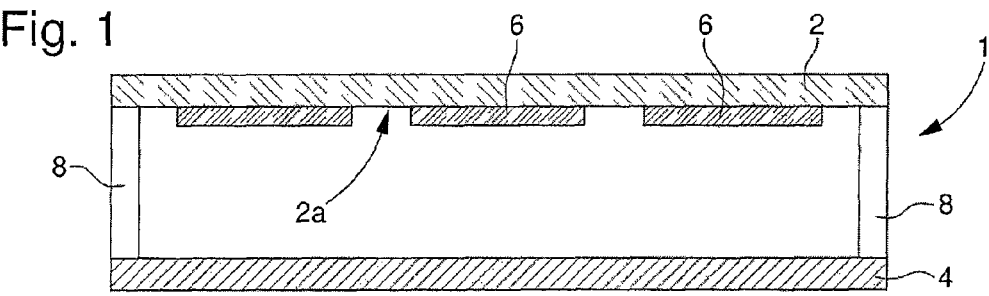
FIG. 1 is a cross-section of a first embodiment example of a capacitive touch-zone screen according to the invention, the front and back substrates being joined to each other by means of a sealing frame.

A first embodiment example of a capacitive touch-zone screen according to the invention is shown in FIG. 1. Designated as a whole by the general reference numeral 1, this touch screen includes first and second substrates, respectively 2 and 4, which extend in parallel to and at a distance from each other. A series of electrodes 6, made of an electrically conductive, transparent material is structured by any suitable technique on the surface 2a of first substrate 2 that faces second substrate 4. According to the invention, the first and second substrates 2, 4 are secured to each other by means of a sealing frame 8. This sealing frame 8, made by any suitable technique such as screen-printing, follows the external periphery of first and second substrates 2, 4. The height of sealing frame 8 can be controlled very precisely and the frame keeps the space between said first and second substrates 2 and 4 constant.

In the following description, any elements that are identical to those described with reference to FIG. 1 will be designated by the same reference numerals.

Figure 2:
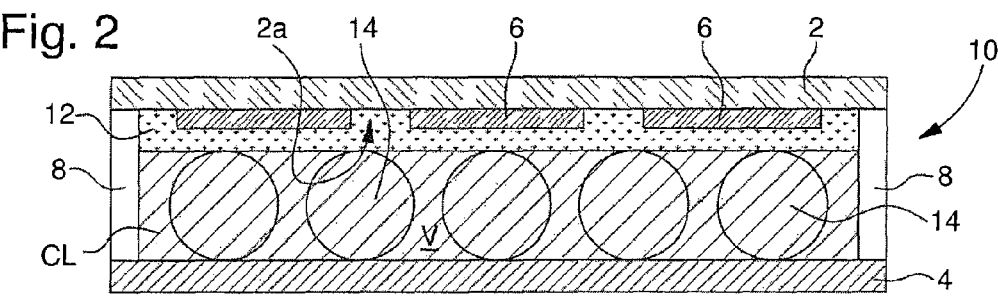
FIG. 2 is a similar view to that of FIG. 1, the electrodes which are structured on the surface of the front substrate that faces the back substrate being coated with a layer of transparent, dielectric material and the space delimited by the sealing frame being filled with liquid crystal, with spacers dispersed in said liquid crystal.

A second embodiment of a capacitive touch-zone screen is shown with reference to FIG. 2. Designated as a whole by the general reference numeral 10, it includes first and second substrates 2 and 4, which extend parallel to and at a distance from each other. First substrate 2 carries a series of electrodes 6 on the surface 2a thereof that faces second substrate 4.

The embodiment of the touch-zone screen shown in FIG. 2 differs from that shown in FIG. 1 in that an intermediate layer 12, made of a transparent, dielectric material, is arranged on surface 2a of first substrate 2 so as to cover electrodes 6. The purpose of this intermediate layer 12 is to compensate optically for the presence of electrodes 6 by homogenizing the refractive index in the layer located at the interface 2a with the first substrate 2, so as to make the electrodes invisible to the naked eye.

The other difference from the embodiment shown in FIG. 1 lies in the fact that the containment volume V delimited by sealing frame 8, is filled with an isotropic or anisotropic liquid CL in which spacers 14 are dispersed.

The filling liquid CL may be a liquid crystal, whose optical refractive index is equal or close to that of first substrate 2. The only function of the filling liquid crystal is to further improve the optical compensation that makes electrodes 6 invisible. Consequently, with the exception of the optical refractive index, the liquid crystal CL is not used for its optical properties, which means that an inexpensive liquid crystal can be used. To prevent domains forming in the liquid crystal volume, intermediate layer 12, in contact with liquid crystal CL, could be brushed It will also be noted that the use of a liquid crystal ensures the chemical compatibility of the liquid crystal with the other materials forming the touch screen according to the invention. Nonetheless, it will be clear that any transparent liquid, such as silicon oil, which is chemically compatible with the other materials involved in forming the touch screen according to the invention, could be used.

Spacers 14 are balls or cylinder portions whose geometrical features are perfectly controlled. Dispersed in filling liquid CL, spacers 14 further improve control of the space between the first and second substrates 2, 4 and the rigidity of the resulting touch screen 10. In particular, this avoids any risk of first substrate 12 bending when the user places his finger thereon, and consequently any risk of the capacitance variation measurement of the zone thereby activated being distorted.

Figure 3:
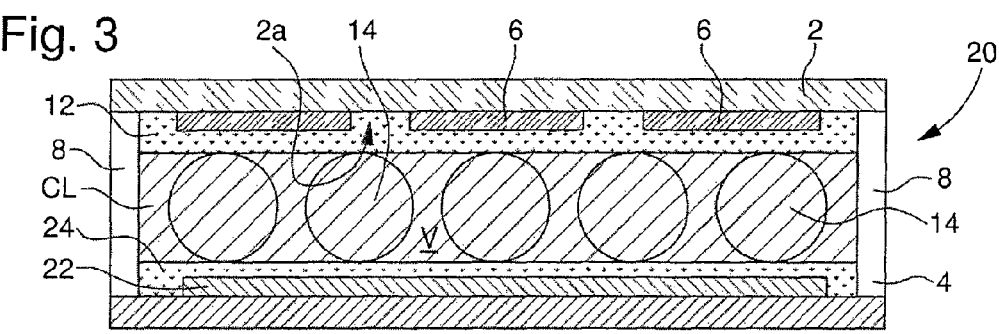
FIG. 3 is a similar view to that of FIG. 2, a second series of electrodes being structured on the surface of the second substrate that faces the first substrate and coated with a layer of a transparent, dielectric material.

The capacitive touch zone screen 20 shown in FIG. 3 differs from that shown in FIG. 2 in that a second series of electrodes 22, made of a transparent, electrically conductive material, is structured by any suitable technique on the surface 4a of second substrate 4 that faces first substrate 2. The two groups of electrodes 6, 22 are typically arranged in a matrix arrangement, the electrodes of electrode group 22 forming the lines, while the electrodes of electrode group 6 form the columns. The capacitance variation is measured at the point concerned, where the user places his finger between an electrode carried by the first substrate 2 and the corresponding electrode carried by the second substrate 4. This type of touch screen 20 is usually called an analogue capacitive touch zone screen as opposed to a touch screen that only has one series of electrodes on the bottom surface of the top substrate, which define specific, well-defined zones that correspond to the place where the user has to place his finger. This type of screen is usually called a digital capacitive touch zone screen. It will be noted that there also exist digital capacitive touch zone screens whose sensitive zones are determined by the intersection of two electrodes, respectively carried by each of the two opposite surfaces of the substrates.

It will be noted that the second series of electrodes 22 is also covered with an intermediate layer 24, made of a transparent, dielectric material and whose purpose is to compensate optically for the presence of electrodes 22 so that they cannot be perceived by the naked eye.

The presence of spacers 14 will also be noted. In combination with sealing frame 8, these spacers make touch screen 20 rigid and maintain a perfectly constant distance between the first and second substrates 2 and 4. Thus, the capacitance Q, which corresponds to the product between the dielectric constant ϵ of the medium that separates one electrode 6 from the corresponding electrode 22 and the surface S corresponding to the intersection of these two electrodes 6, 22, the whole divided by the distance d separating the two electrodes 6, 22, can be kept constant and will only vary when the user places, for example, his finger on the surface of screen 20. Detection of any variation in capacitance Q is thus free of any possible error.

It will be noted that, in the case of the analogue type of capacitive touch zone screen 20 described above, it is possible to transfer the electrodes 6 that form the columns and which are carried by first substrate 2 onto second substrate 4 next to electrodes 22 that form the lines and are carried by said second substrate 4. This transfer can be carried out, for example, by means of a particle charged adhesive (contact in seal technique) or by means of a silver adhesive forming contact points. This transfer enables the line electrodes and column electrodes to be made accessible along a single side of the display screen, which results in a substantial saving of space.

Figure 4:
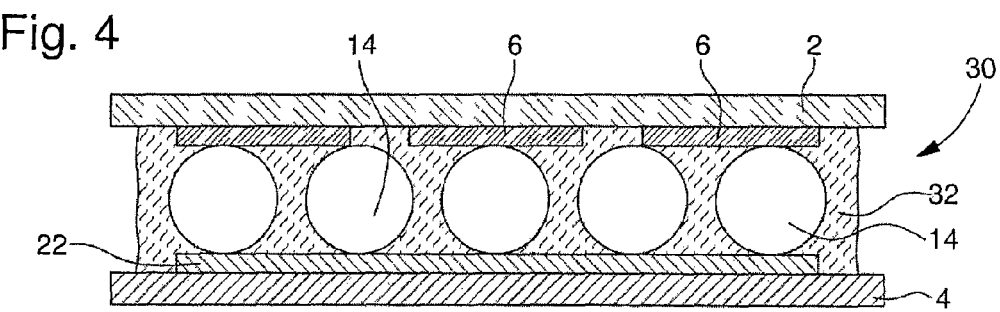
FIG. 4 is a cross-section of an analogue capacitive touch-zone screen whose front and back substrates are joined to each other by means of a layer of optical adhesive in which spacers are dispersed.

The embodiment shown in FIG. 4 is a simplified variant of the touch zone screen illustrated in FIG. 3. FIG. 4 shows that the front and rear substrates 2 and 4 are joined to each other by means of an adhesive layer 32, formed of optical adhesive, in which spacers are dispersed.

It goes without saying that the present invention is not limited to the embodiments that have just been described and that those skilled in the art could envisage various simple variants and alterations, without departing from the scope of the invention as defined by the annexed claims. In particular, the following materials could be used for implementing the invention:

- electrodes 6, 22 could be made of indium and tin oxide, better known as ITO. The thickness of the electrodes is preferably less than or equal to 15 nanometers;
- the first and second substrates 2, 4 are made of a transparent material, such as glass, polymethyl methacrylate (PMMA) or polycarbonate (PC);
- intermediate layers 12, 24, which cover electrodes 6, 22 are made by means of a transparent, dielectric material, such as a polyimide (PI) with a refractive index substantially equal to 1.68, i.e. with an index comprised between the optical refractive index of substrates 2, 4 and the optical refractive index of ITO. The thickness of the polyimide layer is preferably greater than or equal to 70 nanometers;
- the optical adhesive of adhesive layer 32 is chosen with a refractive index comprised between 1.45 and 1.55, i.e. within several hundredths of the optical refractive index of substrates 2, 4, which is here substantially equal to 1.5.

It will be noted that the present invention guarantees a thickness of ±0.1 μm for the dielectric layer separating the electrodes. Thus, for example, for a gap of 9 micrometers between the electrodes, the fluctuations observed are of the order of 1 to 2% at most.

What is claimed is:

1. A capacitive touch screen including first and second substrates extending parallel to and at a distance from each other, said first and second substrates being made of a transparent, dielectric material, a first series of electrodes made of a transparent, electrically conductive material being arranged on at least the surface of the first substrate that faces the second substrate, wherein said touch screen includes means for keeping the space between the two substrates constant.

2. The touch screen according to claim 1, wherein a second series of electrodes, made of a transparent, electrically conductive material, is arranged on the surface of the second substrate that faces the first substrate.

3. The touch screen according to claim 2, wherein the first and second substrates are joined to each other by means of a sealing frame, which extends along the outer perimeter of said two substrates and which defines a volume for containing a fluid, whose optical refractive index is substantially equal to that of the first substrate.

4. The touch screen according to claim 3, wherein the first series of electrodes which are carried by first substrate are transferred onto second substrate next to the second series of electrodes which are carried by second substrate.

5. The touch screen according to claim 4, wherein spacers are dispersed in the volume delimited by the sealing frame.

6. The touch screen according to claim 5, wherein the fluid confined in the volume delimited by the sealing frame is a liquid crystal or a transparent, isotropic or anisotropic fluid, whose optical refractive index is substantially equal to that of the first substrate.

7. The touch screen according to claim 4, wherein the fluid confined in the volume delimited by the sealing frame is a liquid crystal or a transparent, isotropic or anisotropic fluid, whose optical refractive index is substantially equal to that of the first substrate.

8. The touch screen according to claim 3, wherein spacers are dispersed in the volume delimited by the sealing frame.

9. The touch screen according to claim 8, wherein the fluid confined in the volume delimited by the sealing frame is a liquid crystal or a transparent, isotropic or anisotropic fluid, whose optical refractive index is substantially equal to that of the first substrate.

10. The touch screen according to claim 3, wherein the fluid confined in the volume delimited by the sealing frame is a liquid crystal or a transparent, isotropic or anisotropic fluid, whose optical refractive index is substantially equal to that of the first substrate.

11. The touch screen according to claim 2, wherein the first and second substrates are joined to each other by means of an adhesive layer, formed of optical adhesive, in which spacers are dispersed.

12. The touch screen according to claim 1, wherein the first and second substrates are joined to each other by means of a sealing frame, which extends along the outer perimeter of said two substrates and which defines a volume for containing a fluid, whose optical refractive index is substantially equal to that of the first substrate.

13. The touch screen according to claim 12, wherein the first series of electrodes which are carried by first substrate are transferred onto second substrate next to the second series of electrodes which are carried by second substrate.

14. The touch screen according to claim 13, wherein spacers are dispersed in the volume delimited by the sealing frame.

15. The touch screen according to claim 14, wherein the fluid confined in the volume delimited by the sealing frame is a liquid crystal or a transparent, isotropic or anisotropic fluid, whose optical refractive index is substantially equal to that of the first substrate.

16. The touch screen according to claim 13, wherein the fluid confined in the volume delimited by the sealing frame is a liquid crystal or a transparent, isotropic or anisotropic fluid, whose optical refractive index is substantially equal to that of the first substrate.

17. The touch screen according to claim 12, wherein spacers are dispersed in the volume delimited by the sealing frame.

18. The touch screen according to claim 17, wherein the fluid confined in the volume delimited by the sealing frame is a liquid crystal or a transparent, isotropic or anisotropic fluid, whose optical refractive index is substantially equal to that of the first substrate.

19. The touch screen according to claim 12, wherein the fluid confined in the volume delimited by the sealing frame is a liquid crystal or a transparent, isotropic or anisotropic fluid, whose optical refractive index is substantially equal to that of the first substrate.

20. The touch screen according to claim 1, wherein an intermediate layer, made of a transparent, dielectric material, is arranged on the surface of at least one of the first and second substrates, which carries the first, respectively the second, series of electrodes so as to cover said electrodes.

21. The touch screen according to claim 20, wherein the first and second substrates are joined to each other by means of an adhesive layer, formed of optical adhesive, in which spacers are dispersed.

22. The touch screen according to claim 20, wherein the intermediate layer of transparent, dielectric material has an optical refractive index comprised between the optical refractive index of the first substrate and the optical refractive index of the electrically conductive material of which the electrodes are made.

23. The touch screen according to claim 22, wherein the intermediate layer of transparent, dielectric material is made of a polyimide with an optical refractive index that is substantially equal to 1.68.

24. The touch screen according to claim 1, wherein the first and second substrates are joined to each other by means of an adhesive layer, formed of optical adhesive, in which spacers are dispersed.

25. The touch screen according to claim 24, wherein the intermediate layer of transparent, dielectric material has an optical refractive index comprised between the optical refractive index of the first substrate and the optical refractive index of the electrically conductive material of which the electrodes are made.

26. The touch screen according to claim 1, wherein the thickness of the electrodes is less than or equal to fifteen nanometers.

27. The touch screen according to claim 26, wherein the electrodes are made of indium and tin oxide.

* * * * *